Dec. 23, 1952        H. WESLAKE        2,622,579
COMBUSTION CHAMBER FOR INTERNAL-COMBUSTION ENGINES
Filed Jan. 9, 1948        2 SHEETS—SHEET 1

INVENTOR
HENRY WESLAKE

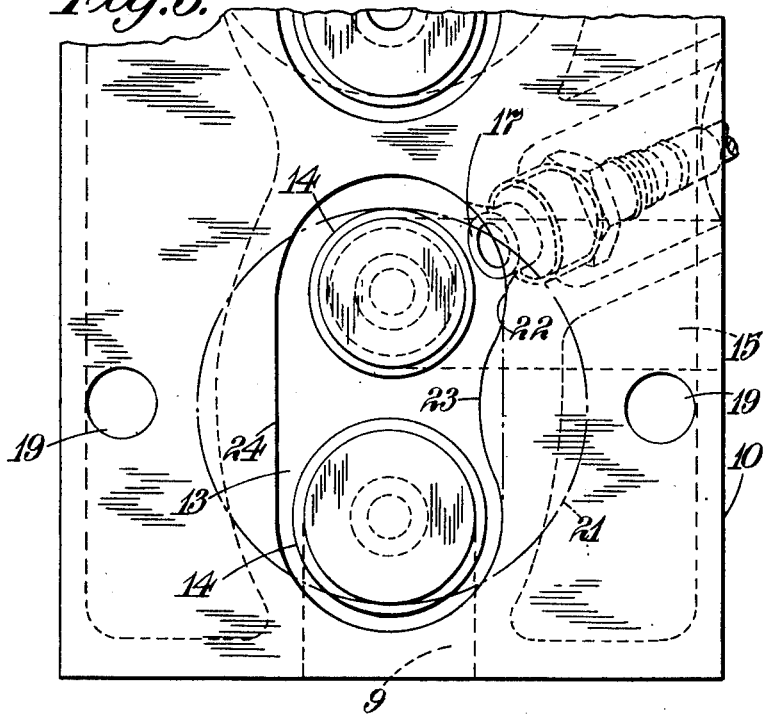

Patented Dec. 23, 1952

2,622,579

UNITED STATES PATENT OFFICE 2,622,579

COMBUSTION CHAMBER FOR INTERNAL-COMBUSTION ENGINES

Henry Weslake, Surbiton, England

Application January 9, 1948, Serial No. 1,288
In Great Britain July 12, 1943

Section 1, Public Law 690, August 8, 1946
Patent expires July 12, 1963

2 Claims. (Cl. 123—191)

The invention relates to combustion chambers for internal-combustion engines of the kind in which the inlet and exhaust valve ports are arranged side-by-side in the roof of the combustion chamber over the cylinder.

According to this invention, a cylinder for internal combustion engines is formed with a combustion chamber having an inlet and exhaust valve seats arranged side by side in a roof portion of said chamber, and having a peripheral wall formed with a projection extending downwards to the roof portion for the full length thereof into an area intersected by a line extending between the two valve seats, which projection merges in a smooth curve and with curved portions of the peripheral wall adjacent the seats, and a spark plug socket on the same side of the combustion chamber as said projection and to one side thereof.

It is found with this arrangement that the power developed by the engine over a wide range of throttle openings is increased, and is particularly apparent at low throttle openings. This is thought to be due to the fact that the curved walls of the combustion chamber merging with the aforesaid projection promotes a swirl around the peripheral wall of the combustion chamber, and stratification of the mixture with the richer mixture in the outer layer, and since the spark plug is situated in the peripheral wall a readily combustible mixture is presented to it, even at small throttle openings, and rapid combustion takes place. This effect may be enhanced by providing the spark plug socket with a recess in the mouth thereof which thus collects the richer mixture in the neighbourhood of the spark plug.

The contour of the other parts of the peripheral walls follow the contour of the valve seats.

The following is a description of one embodiment of the invention as applied to a combustion chamber for an internal combustion engine having the cylinder head formed in two parts of different heat conductivity, the part of greater conductivity being arranged next to the cylinder, reference being made to the accompanying drawings, in which:

Figure 3 is a bottom plan view of an alternative form of cylinder head.

Figure 1:
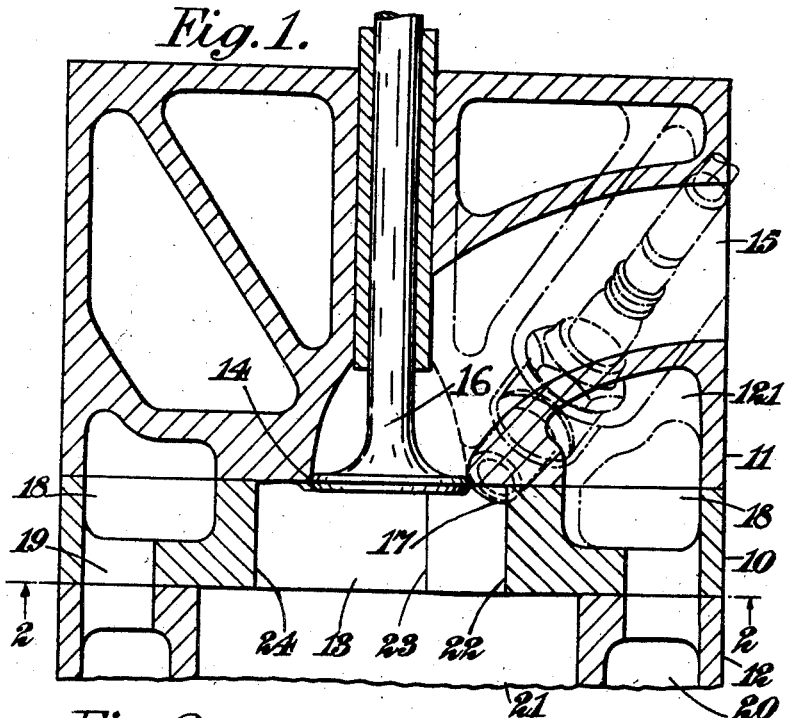
Figure 1 is a section through the cylinder head and top part of the cylinder along the cylinder axis.

The cylinder head is formed in two parts 10 and 11, the part 10 adjacent the top of the cylinder 12 being formed from a metal of good heat conductivity, such as bronze, and the part 11 from a metal having a lesser heat conductivity, such as cast iron, which parts may be welded or brazed together. The peripheral wall of the combustion clearance space 13 is formed in the part 10, whereas, the roof of the clearance space containing the inlet and exhaust valve seats 14 is shown in the part 11. The inlet and exhaust passages 9 and 15 and the valve stem 16 and the spark plug socket 17 are also arranged in the part 11. The part 10 is provided on its outer face with recesses 18 which communicate through apertures 19 with the jacket space 20 surrounding the cylinder. The recesses also register with cooling spaces 121 in the part 11.

Figure 2:
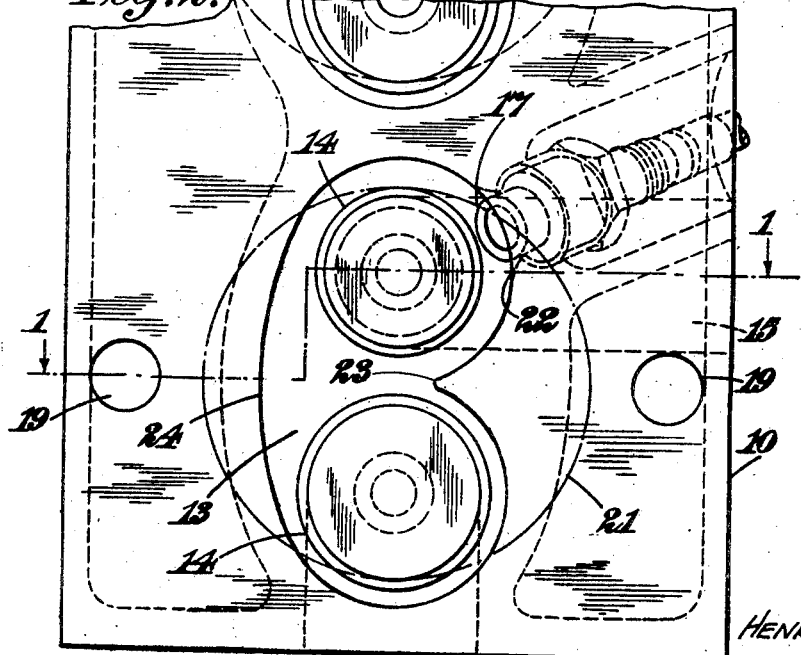
Figure 2 is an under plan view of the cylinder head.

The invention is particularly concerned with the shape of the peripheral walls 22 of the combustion clearance space. As will be seen from Figure 2, the peripheral wall is provided with a protruding portion 23 which projects into the space between the two valve seats 14. As indicated above, by choosing an appropriate size for the protruding portion, the required degree of turbulence for the inflowing gases may be obtained. The peripheral wall 24 opposite the protuberance may either be curved or flat. As the piston descends from top dead center during the suction stroke, the projection 23 causes the combustible gases to sweep past the portion 24 of the peripheral wall over the exhaust valve and past the spark plug in an ordered swirling motion. The extent of curvature of the part 24 is selected so as to avoid restriction of flow of gases from the inlet valve, and the degree of curvature being dependent upon the extent of the protruding portion 23. For example, in Figure 3 the projection 23 is less pronounced than in Figure 2, and the opposite wall is flat, or nearly flat. The extent of projection and curvature of the opposite wall are selected in accordance with the extent of swirl required. The spark plug socket 17 is arranged on the same side of the combustion chamber as the protruding portion 23, preferably adjacent the exhaust valve seat, and is bell-mouthed in order to produce a local swirl. The part of the combustion chamber containing the spark plug is necessarily at a higher temperature than the opposite wall. The protruding portion 23 causes the inlet gases to be discharged on to the cooler side of the combustion chamber, thereby enhancing the volumetric efficiency and also introduces the required amount of swirl.

I claim:

1. A cylinder head for an internal combustion engine having a cylinder, said head being formed with a combustion chamber and having inlet and exhaust valve seats arranged side by side in a roof portion of said chamber and having a peripheral wall formed with a projection extending downwards from the roof portion for the full height of the chamber and inwardly toward the area between the two valve seats, which projection merges in a smooth curve with curved portions of the peripheral wall adjacent the seats and a spark plug socket on the same side of the combustion chamber as said projection and to one side thereof, the dimension of the combustion chamber across the valve seats being greater than the diameter of the engine cylinder.

2. A cylinder head for an internal combustion engine having a cylinder, said head being formed with a combustion chamber and having inlet and exhaust valve seats arranged side by side in a roof portion of said chamber and having a peripheral wall formed with a projection extending downwards from the roof portion for the full height of the chamber and inwardly toward the area between the two valve seats, which projection merges in a smooth curve with curved portions of the peripheral wall adjacent the seats and a spark plug socket on the same side of the combustion chamber as said projection and on that side thereof nearer the exhaust valve seat, the dimension of the combustion chamber across the valve seats being greater than the diameter of the engine cylinder.

HENRY WESLAKE.

REFERENCES CITED

The following references are of record in the file of this patent:

UNITED STATES PATENTS

| Number | Name | Date |
|---|---|---|
| 1,757,399 | Taub | May 6, 1930 |
| 1,792,867 | Radford | Feb. 17, 1931 |
| 1,835,302 | Horning | Dec. 8, 1931 |
| 1,887,897 | Whatmough | Nov. 15, 1932 |
| 1,903,159 | Asbury | Mar. 28, 1933 |